Figure 1:
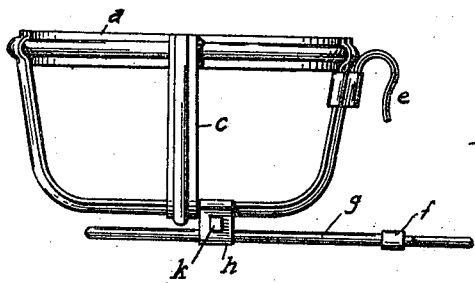

C. M. STARR.
CARRIER FOR BICYCLES.
APPLICATION FILED DEC. 1, 1908.

975,085.

Patented Nov. 8, 1910.

Witnesses
J. S. Freeman.
B. N. Hishburne

Inventor
Charles M. Starr,

By
C. L. Parker, Attorney

UNITED STATES PATENT OFFICE.

CHARLES M. STARR, OF SOUTH BEND, INDIANA.

CARRIER FOR BICYCLES.

975,085.

Specification of Letters Patent.  Patented Nov. 8, 1910.

Application filed December 1, 1908.  Serial No. 465,568.

*To all whom it may concern:*

Be it known that I, CHARLES M. STARR, a citizen of the United States, residing at South Bend, in the county of St. Joseph and State of Indiana, have invented certain new and useful Improvements in Carriers for Bicycles, of which the following is a specification.

This invention relates to parcel carriers and is especially designed for use upon bicycles.

My object is to provide a strong and simple carrier quickly adjustable to fit any bicycle and that can be quickly attached or removed from the bicycle.

Reference is to be had to the accompanying drawings in which similar letters denote similar parts in the different views.

As shown in the drawings the carrier is preferably made of a shape and size for an ordinary market basket to fit in and this form is especially useful to grocers and butchers as they can pack the articles in the basket and then place the basket in the carrier.

Figure 2:
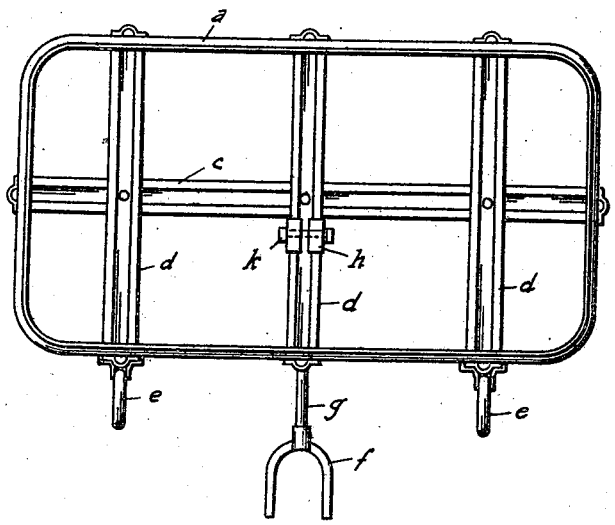
Figure 3:
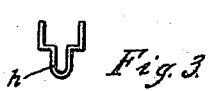
Figure 4:

Figure 1 is an end view of carrier, Fig. 2 is a plan view of same and Fig. 3 is a detail view of the binder before being attached to the carrier the view being an edge view. Fig. 4 is a detail plan view of one of the supporting hooks before being attached to the carrier.

The carrier is preferably made of flat steel bands deeply corrugated to give great stiffness with the least weight. The carrier consists essentially of a top member or frame, $a$, to which is attached a longitudinal member or rib $c$, and also three transverse ribs, $d$. These ribs are riveted at their intersections with each other and to the frame, $a$, to make a stiff holder for the market basket.

$e$, $e$, are the supporting hooks which hook over the handle bars of the bicycle in the ordinary way. The hooks are preferably made by brazing or otherwise attaching the hook part to a U shaped sheet steel clip the extremities of the clip being clenched around the transverse ribs, thus making a strong and neat hook and having an advantage to be mentioned later.

$f$ is a fork end preferably a malleable casting which is rigidly attached to a steel rod $g$, or it may be all cast in one piece if preferred. This constitutes a forked brace to hold the carrier in a level position. The forked end embraces the head of wheel and the steel rod or shank passes through a steel binder, $h$, which is attached to the central transverse rib by clenching the extremities of the binder or clip around the rib as shown in Fig. 2. The shank or forked brace can be slid through the binder to adjust the carrier to fit any bicycle and immediately clamped in its adjusted position by the bolt, $k$, which passes crosswise through binder as shown.

If desired the carrier may be made with closer ribs and much deeper and would then be useful as a newspaper carrier. In this form when used on bicycles with low handlebars the carrier is apt to touch the front wheel and in such cases the construction of the supporting hooks have this advantage; they may be driven downward until the carrier clears the front wheel and then clenched up tightly on the ribs with a hammer if necessary. Thus, with the adjustable hooks and adjustable forked brace the carrier can be made to fit any bicycle.

I am aware that carriers have been made with a supporting brace under them but the brace has been rigidly attached to the bicycle and hence the carrier cannot be immediately removed from the bicycle, which is a great disadvantage as grocers and others often wish to use their bicycles without the carrier and when it is needed they wish to quickly replace it.

My construction enables any one to instantly remove carrier or replace it and without the use of any tools.

Having described my invention, what I claim as new and useful and desire to secure by Letters Patent of the United States, is—

In a device of the character described, a basket-like receptacle, hooks connected to said receptacle and extending laterally and outwardly from one side of said receptacle, a brace rod longitudinally adjustably mounted upon said receptacle, the outer end of said brace rod being bifurcated, and the bifurcated end of said brace rod and said hooks extending in the same direction so that the same may be removably arranged upon the head and handle bars of a bicycle respectively.

In testimony whereof I have signed this specification in the presence of two subscribing witnesses.

CHARLES M. STARR.

Witnesses:
 HENRY L. SPOHN,
 WM. M. PATTERSON.